United States Patent
Shibata et al.

(10) Patent No.: US 8,418,794 B2
(45) Date of Patent: Apr. 16, 2013

(54) STRADDLE-TYPE VEHICLE

(75) Inventors: Masanori Shibata, Shizuoka (JP);
Takeshi Okada, Shizuoka (JP);
Takayuki Oishi, Shizuoka (JP); Makio Koike, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 210 days.

(21) Appl. No.: 12/920,625

(22) PCT Filed: Mar. 5, 2009

(86) PCT No.: PCT/JP2009/054213
§ 371 (c)(1),
(2), (4) Date: Nov. 16, 2010

(87) PCT Pub. No.: WO2009/110573
PCT Pub. Date: Sep. 11, 2009

(65) Prior Publication Data
US 2011/0100742 A1 May 5, 2011

(30) Foreign Application Priority Data

Mar. 7, 2008 (JP) .................................. 2008-058700
Mar. 7, 2008 (JP) .................................. 2008-058753

(51) Int. Cl.
*B62J 37/00* (2006.01)
(52) U.S. Cl.
USPC ....................................................... 180/219
(58) Field of Classification Search ................... 180/219
See application file for complete search history.

(56) References Cited

U.S. PATENT DOCUMENTS

| 8,235,157 B2 * | 8/2012 | Cheng et al. ................. 180/219 |
| 2010/0051369 A1 * | 3/2010 | Kuramochi et al. ......... 180/69.4 |
| 2010/0206653 A1 * | 8/2010 | Koike ........................... 180/225 |
| 2011/0240392 A1 * | 10/2011 | Iwata et al. .................. 180/229 |
| 2011/0284307 A1 * | 11/2011 | Mori et al. ................... 180/296 |
| 2011/0308874 A1 * | 12/2011 | Tanaka ......................... 180/219 |

FOREIGN PATENT DOCUMENTS

| JP | 53-131122 U | 10/1978 |
| JP | 56-53972 A | 5/1981 |
| JP | 04-038281 A | 2/1992 |
| JP | 05-086994 A | 4/1993 |
| JP | 06-305469 A | 11/1994 |
| JP | 2005-075322 A | 3/2005 |
| JP | 2007-153071 A | 6/2007 |
| JP | 2012007537 A * | 1/2012 |

OTHER PUBLICATIONS

Official Communication issued in International Patent Application No. PCT/JP2009/054213, mailed on May 26, 2009.
Official Communication issued in corresponding European Patent Application No. 09716983.3, mailed on Aug. 3, 2012.

* cited by examiner

*Primary Examiner* — Kevin Hurley
(74) *Attorney, Agent, or Firm* — Keating & Bennett, LLP

(57) ABSTRACT

A straddle-type vehicle includes a canister that is arranged to be warmed up during an operation of an engine and is arranged to be cooled down during a stop of the engine. In the straddle-type vehicle, a fuel tank is arranged over an engine, at least a portion of a carburetor that constitutes a throttle body is arranged below the fuel tank and behind a cylinder and a cylinder head, and at least a portion of a canister is arranged between the fuel tank and the cylinder head.

13 Claims, 12 Drawing Sheets

STRADDLE-TYPE VEHICLE

BACKGROUND OF THE INVENTION

1. Field of the Invention

The present invention relates to a straddle-type vehicle, and more particularly, to an arrangement of a canister in a straddle-type vehicle.

2. Description of the Related Art

In a straddle-type vehicle such as a motorcycle, a fuel evaporation gas emission suppressing device using activated carbon, which is commonly referred to as a canister, is provided for the purpose of suppressing gas (evaporation fuel) generated by evaporation of fuel in a fuel tank from being emitted to the air. JP 05-86994 A discloses a motorcycle provided with the canister arranged in front of an engine.

Incidentally, it is known that the activated carbon contained in the canister has characteristics that make it more liable to absorb the evaporation fuel when cooled down, and more liable to emit the evaporation fuel when warmed up. Therefore, from a viewpoint of suppressing the evaporation fuel from being emitted to the air, it is preferred that the canister be cooled down, and that the evaporation fuel be thereby likely absorbed by the activated carbon. Also in JP 05-86994 A, the canister is arranged in front of the engine from this viewpoint.

Meanwhile, the canister is connected to a throttle body, and during an operation of the engine, the evaporation fuel is drawn out of the canister and is taken into the engine. Accordingly, from such a viewpoint, it is preferred that the canister be warmed up, and that the evaporation fuel be thereby likely to be emitted from the activated carbon. Specifically, the canister is required to be warmed up during the operation of the engine, and to be cooled down during a stop of the engine.

However, the canister in JP 05-86994 A described above is arranged in front of the engine, and is liable to be cooled down by receiving a running wind while the motorcycle is running. Accordingly, the canister does not meet such a requirement to be warmed up during the operation of the engine. Further, the canister arranged in front of the engine as described above is often exposed to direct sunlight, and is liable to be warmed up while the motorcycle is stopped. Accordingly, the canister does not meet such a requirement to be arranged to be cooled down while the engine is stopped.

SUMMARY OF THE INVENTION

In view of the above-described actual circumstances, preferred embodiments of the present invention provide a straddle-type vehicle including a canister that is arranged to be warmed up during the operation of the engine, and arranged to be cooled down while the engine is stopped.

A straddle-type vehicle according to a preferred embodiment of the present invention includes an engine, a fuel tank, a throttle body and a canister. The engine includes a crankcase, a cylinder arranged on the crankcase, and a cylinder head arranged on the cylinder, and generates power to drive a wheel. The fuel tank is arranged over the engine, and stores fuel consumed by the engine. The throttle body is at least partially arranged below the fuel tank and behind the cylinder and the cylinder head, and adjusts an amount of an air-fuel mixture supplied to the engine. The canister is connected to the fuel tank and the throttle body, and suppresses gas generated by evaporation of the fuel in the fuel tank from being emitted to an air. The canister is at least partially arranged between the fuel tank and the cylinder head.

In accordance with a preferred embodiment of the present invention described above, the canister is at least partially arranged between the fuel tank and the cylinder head, and accordingly, the canister is arranged to be warmed up by receiving heat from the cylinder head during an operation of the engine. Further, the canister is rarely exposed to direct because the fuel tank covers an upper portion of the canister, and accordingly, the canister is also arranged to be cooled down during a stop of the engine.

Further, according to a preferred embodiment of the present invention, in comparison with the case where the canister is arranged in front of the engine as in JP 05-86994 A described above, the engine is arranged to receive the running wind, and accordingly, cooling capacity of the engine is enhanced. Further, in a preferred embodiment of the present invention, heat received by the fuel tank from the cylinder head is reduced by the canister interposed therebetween, and accordingly, the evaporation of the fuel in the fuel tank is suppressed and minimized.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
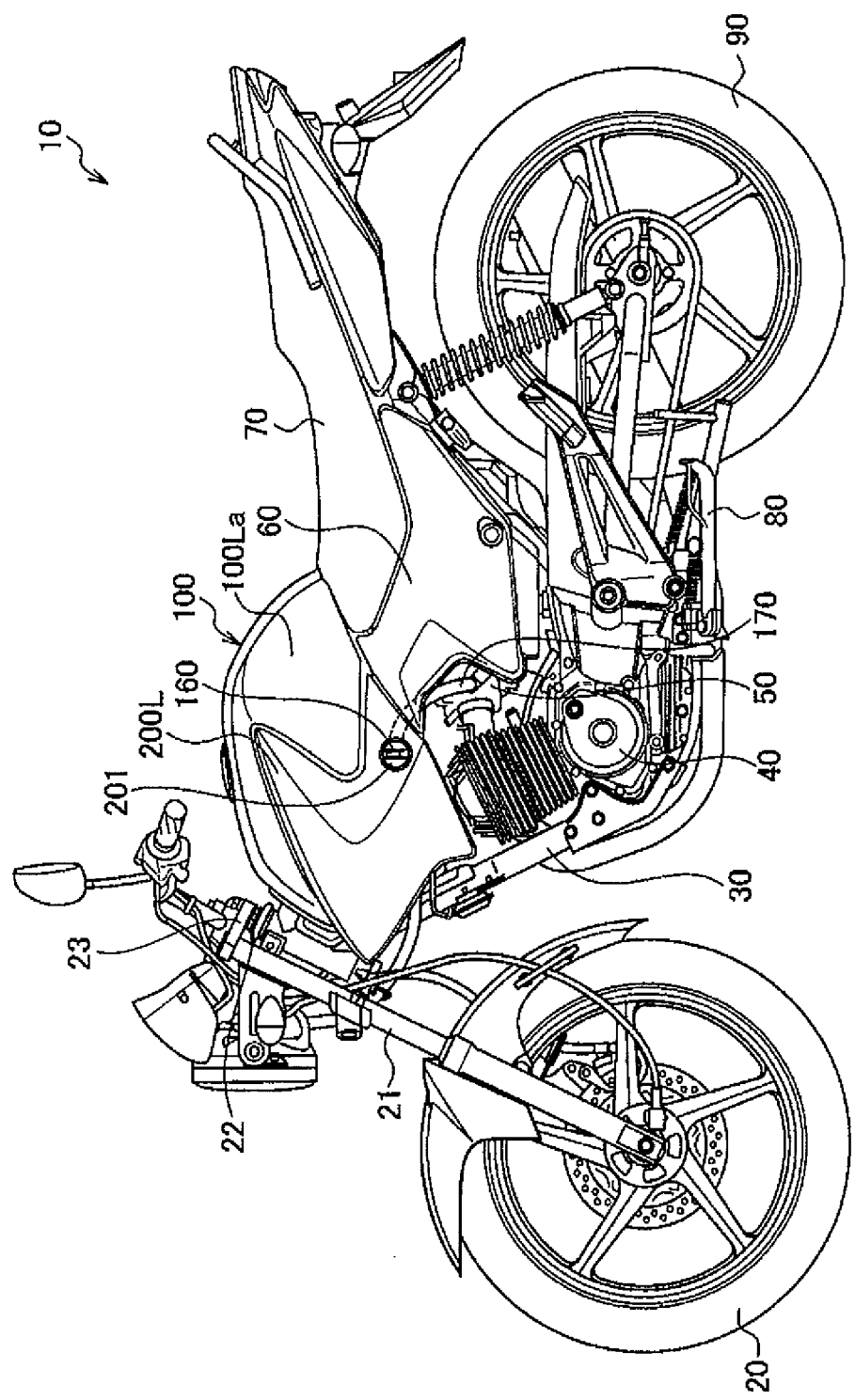
FIG. 1 is a left side view of a motorcycle as a straddle-type vehicle according to a preferred embodiment of the present invention.

Next, a description is made of a straddle-type vehicle according to preferred embodiments of the present invention while referring to the drawings. Specifically, a description is made of: (1) an entire schematic structure; (2) a structure of peripheral portions of an engine of a motorcycle; (3) an attachment position of a canister; (4) a structure of a fuel tank; (5) a structure of a body frame; (6) a structure of the canister; (7) a carburetor structure; (8) functions/effects; and (9) other preferred embodiments.

Note that, in the following description of the drawings, the same or similar reference symbols are assigned to the same or similar portions. However, the drawings are schematic, and it should be noted that ratios of the respective dimensions and the like are different from actual ones.

Hence, specific dimensions and the like should be determined in consideration of the following description. Further, portions in which mutual dimensional relationships and ratios are different from one another are also included among the mutual drawings.

(1) Entire Schematic Structure

Figure 2:
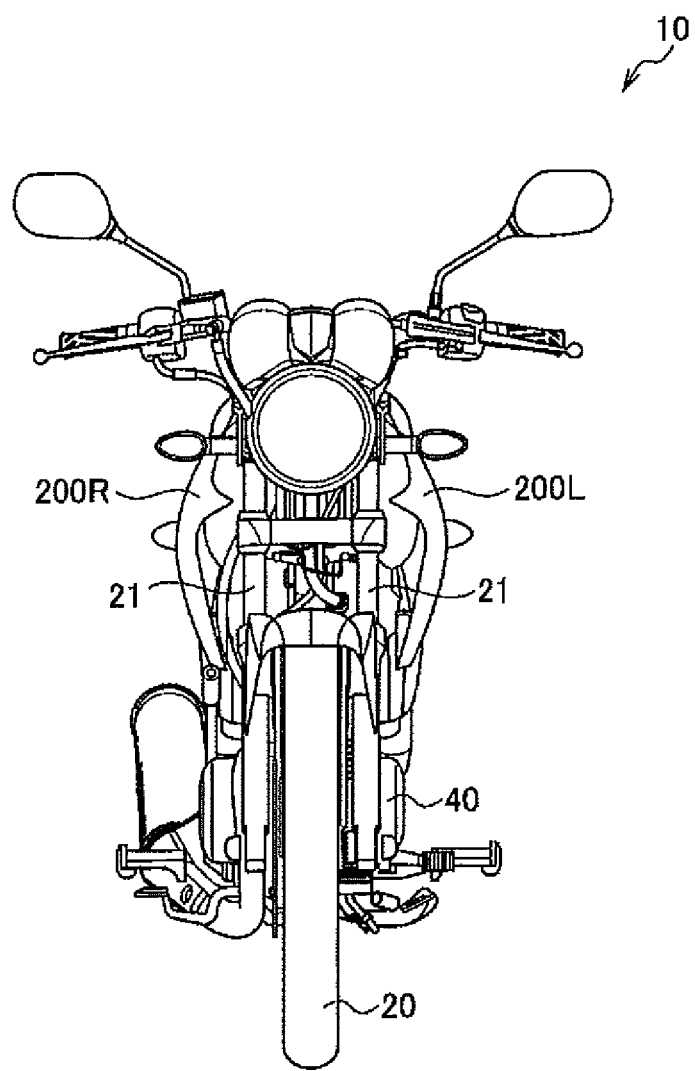
FIG. 2 is a front view of the motorcycle as the straddle-type vehicle according to a preferred embodiment of the present invention.

First, a description is made of an entire schematic structure of a motorcycle 10 as a straddle-type vehicle according to the present preferred embodiment. FIG. 1 is a left side view of the motorcycle 10. FIG. 2 is a front view of the motorcycle 10.

As illustrated in FIG. 1 and FIG. 2, the motorcycle 10 includes a body frame 30 that defines a skeleton of the motorcycle 10. The motorcycle 10 includes a front wheel 20, front forks 21, an engine 40, a carburetor 50, a side cover 60, a seat 70, a side stand 80, a rear wheel 90, and a fuel tank 100. The engine 40, the side cover 60, the seat 70, the side stand 80 and the fuel tank 100 are attached to the body frame 30.

The front wheel 20 is rotatably supported by the front forks 21 coupled to the body frame 30.

The front forks 21 are coupled to a steering shaft 22 through a bridge 23. The steering shaft 22 is supported by the body frame 30. The steering shaft 22 is supported so as to be rotatable left and right with respect to a traveling direction of the motorcycle 10.

The engine 40 is a power unit that generates drive force of the motorcycle 10. The engine 40 is attached to the body frame 30 at a substantial center in a longitudinal direction of the motorcycle 10. The engine 40 generates the drive force transmitted to the rear wheel 90. The drive force generated in the engine 40 is transmitted to the rear wheel 90 by a chain.

The carburetor 50 adjusts an air-fuel mixture supplied to the engine 40. In this preferred embodiment, the carburetor 50 is preferably constituted as a throttle body, for example. Note that not only the carburetor 50 but also an electronic fuel injection device may be used, for example.

The side cover 60 covers sideward of the body frame 30. The side cover 60 is arranged on the left side portion of the motorcycle 10. Specifically, the side cover 60 is provided below a rear portion of the fuel tank 100 and a front portion of the seat 70. Note that a side cover (not shown in FIG. 1) having a substantially symmetrical shape to that of the side cover 60 is arranged on a right side portion of the motorcycle 10.

The seat 70 is arranged rearward of the fuel tank 100. A rider is seated on the seat 70.

The side stand 80 supports the motorcycle 10 at the time of parking the motorcycle 10. The side stand 80 is preferably arranged on a left side portion of the motorcycle 10, for example.

The fuel tank 100 reserves fuel supplied to the engine 40. The fuel tank 100 is arranged above the engine 40.

The fuel tank 100 includes a left side portion 100La. A shroud 200L is attached to the left side portion 100La. Further, the fuel tank 100 includes a right side portion 100Ra. A shroud 200R is attached to the right side portion 100Ra (not shown in FIG. 1, refer to FIG. 3).

The shrouds 200L and 200R extend downward from the side portions 100La and 100Ra of the fuel tank 100.

Further, the motorcycle 10 includes a fuel hose 170 arranged to supply the fuel from the fuel tank 100 to the carburetor 50. The fuel hose 170 is arranged between the fuel tank 100 and the carburetor 50. In this preferred embodiment, the fuel hose 170 constitutes a fuel passage.

Further, the motorcycle 10 includes a fuel cock 160. The fuel hose 170 is coupled to the fuel cock 160. The fuel cock 160 opens and closes the fuel hose 170. The fuel hose 170 is preferably arranged on the left side portion of the motorcycle 10 in this preferred embodiment, for example.

The fuel cock 160 is arranged in an inside of the shroud 200L in a vehicle width direction. The fuel cock 160 faces the outside from an opening portion 201 formed in the shroud 200L.

(2) Structure of Peripheral Portions of Engine 40 of Motorcycle 10

Figure 3:
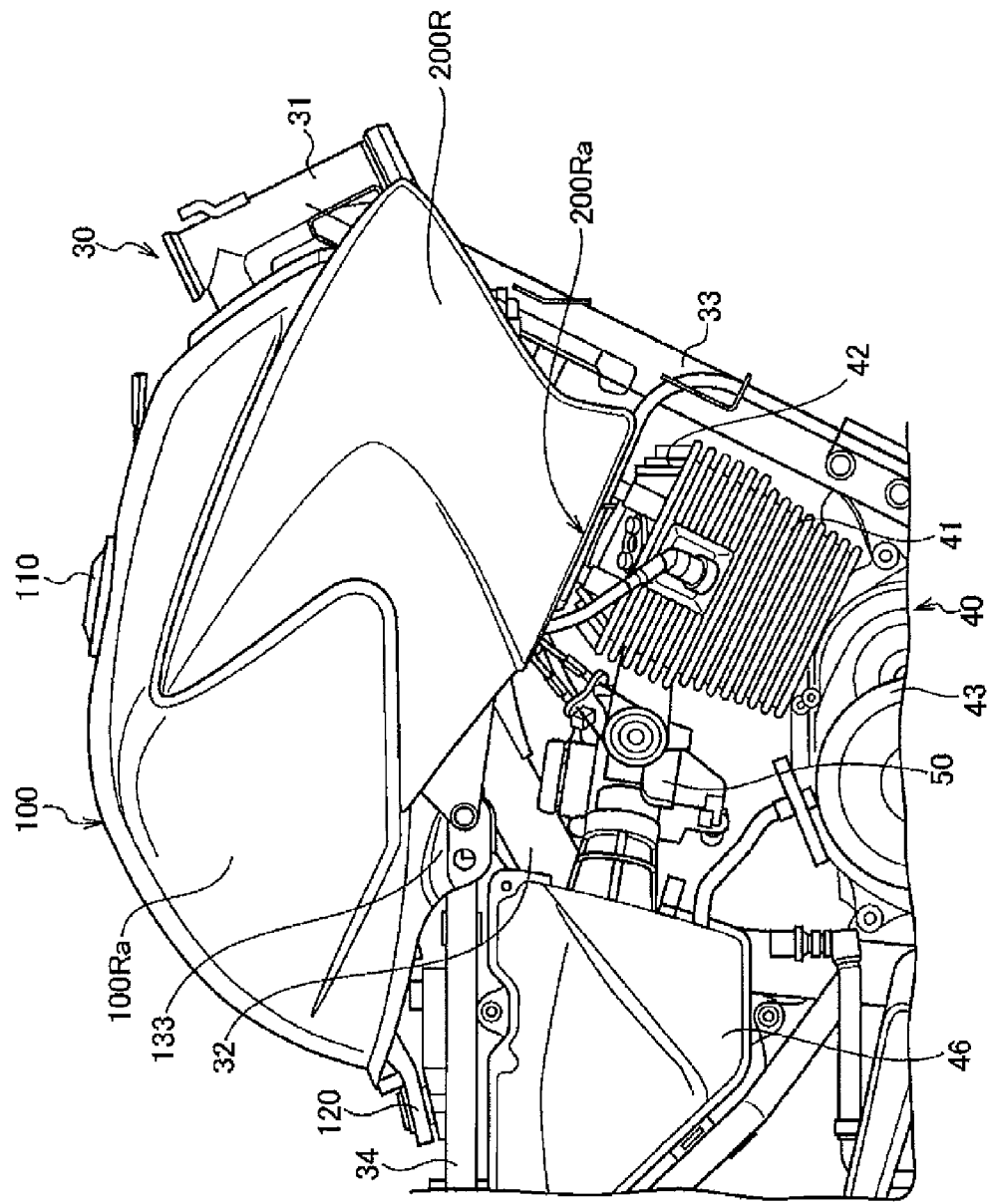
FIG. 3 is a right side view of the motorcycle as the straddle-type vehicle according to a preferred embodiment of the present invention in a state in which a side cover is detached.
Figure 4:
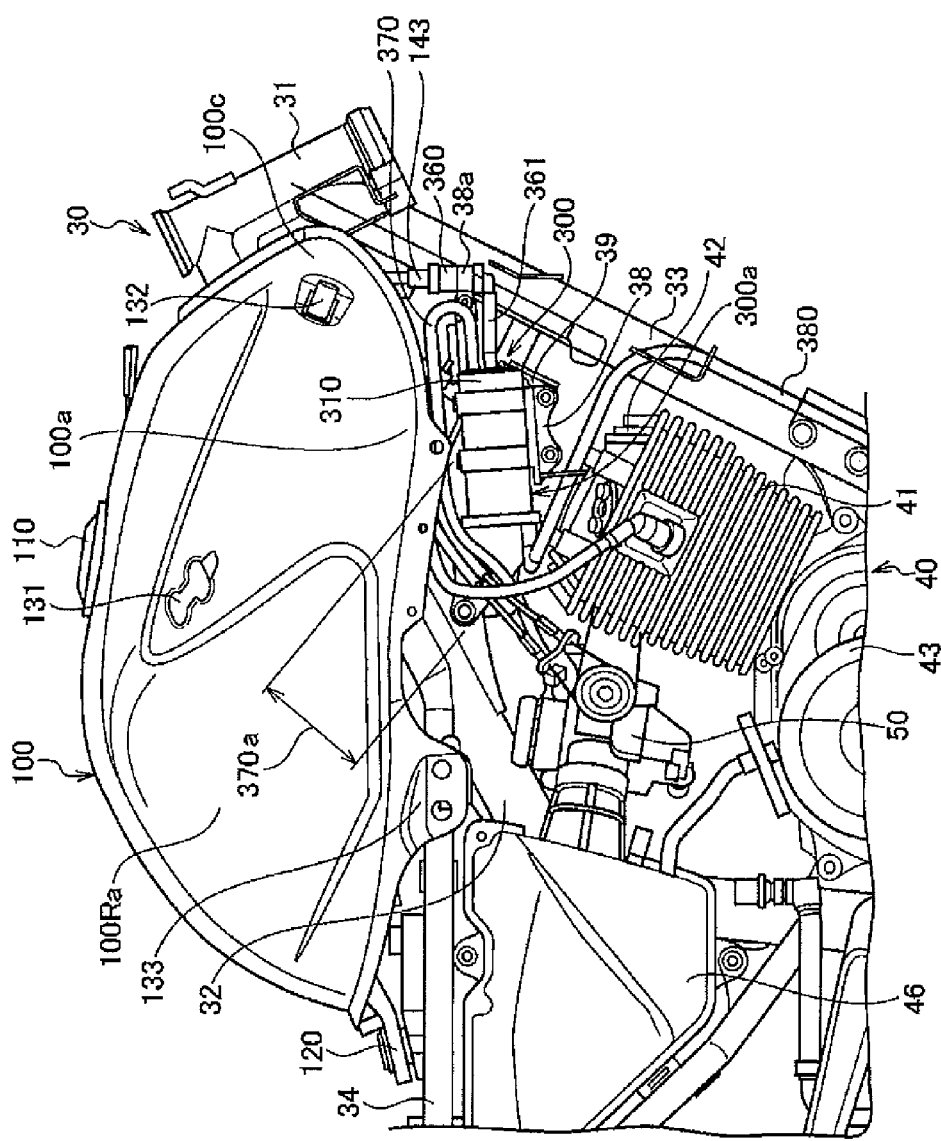
FIG. 4 is a right side view of the motorcycle as the straddle-type vehicle according to a preferred embodiment of the present invention in a state in which the side cover and a shroud are detached.
Figure 5:
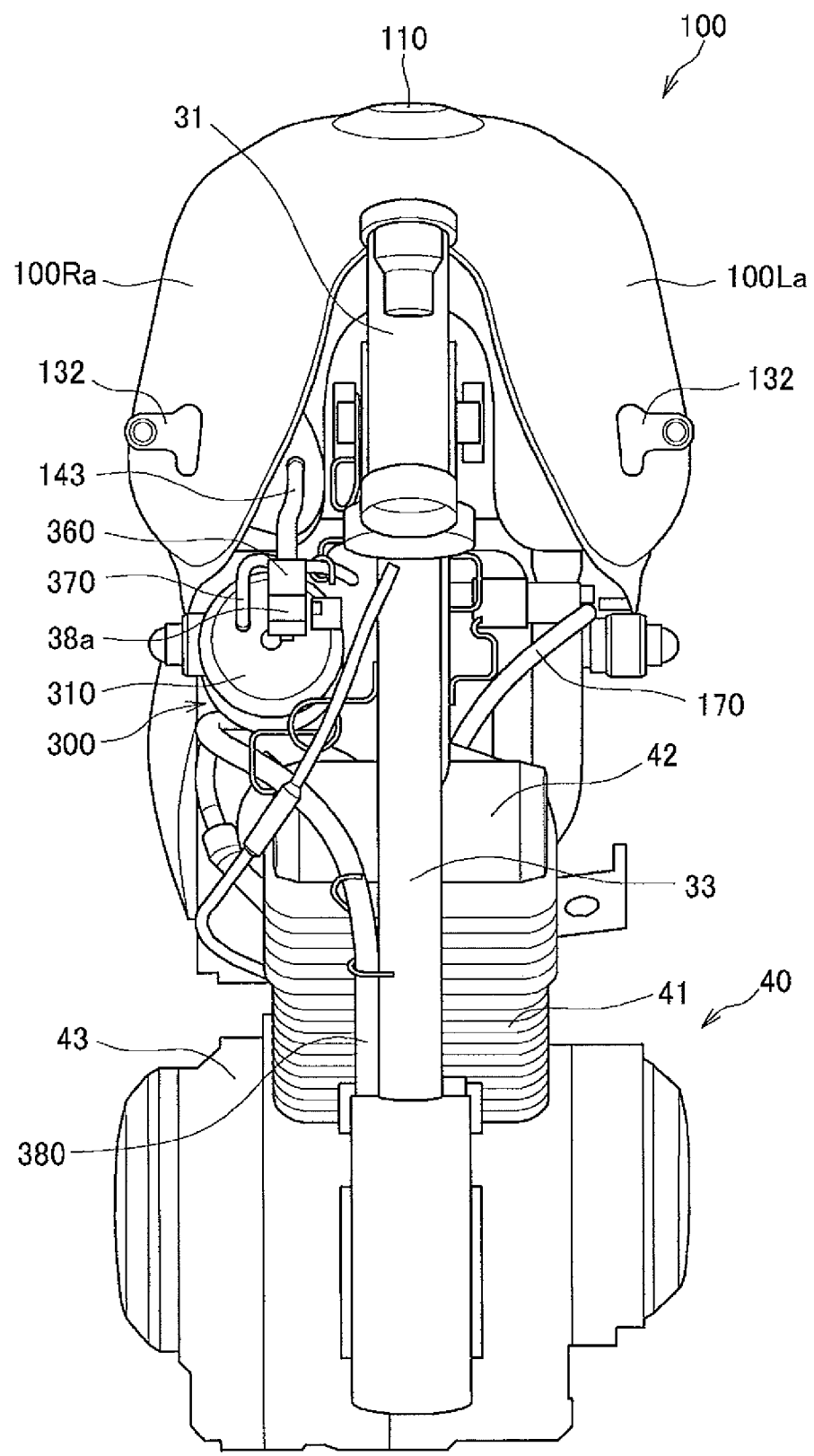
FIG. 5 is a front view of the motorcycle as the straddle-type vehicle according to a preferred embodiment of the present invention in the state in which the side cover and the shroud are detached.

Next, a description is made of the peripheral portions of the engine 40 of the motorcycle 10 with reference to FIG. 3, FIG. 4 and FIG. 5. FIG. 3 is a right side view of the peripheral portions of the engine 40 of the motorcycle 10 in a state in which the side cover 60 provided on the side portion thereof is detached. FIG. 4 and FIG. 5 are a right side view and front view of the peripheral portions of the engine 40 of the motorcycle 10 in a state in which the side cover 60 and the shroud 200R are detached, respectively. In these drawings, a state in which the steering shaft 22 is detached from the body frame 30 is illustrated.

As illustrated in FIG. 3, FIG. 4 and FIG. 5, the body frame 30 includes a steering head pipe 31, a main frame 32, a down tube 33, and a seat frame 34.

The steering head pipe 31 supports the steering shaft 22 (refer to FIG. 1). The steering shaft 22 is supported by the steering head pipe 31 so as to be rotatable left and right with respect to the traveling direction of the motorcycle 10.

The main frame 32 extends rearward from the steering head pipe 31. The down tube 33 extends obliquely downward to the rear from the steering head pipe 31. The seat frame 34 is coupled to the main frame 32.

The engine 40 preferably is an air-cooled single-cylinder engine, and includes a crankcase 43, a cylinder 41 arranged on the crankcase 43, and a cylinder head 42 arranged on the cylinder 41. The cylinder 41 is arranged along the down tube 33.

The carburetor 50 is arranged below the fuel tank 100. Specifically, the carburetor 50 is arranged below the fuel tank 100 and rearward of the cylinder 41 and the cylinder head 42. Further, the carburetor 50 is arranged at the lower right position of the main frame 32. The carburetor 50 is coupled to the cylinder 41.

The motorcycle 10 includes an air cleaner 46. The air cleaner 46 is arranged below the seat frame 34 and rearward of the carburetor 50. The air cleaner 46 is coupled to the carburetor 50. The air cleaner 46 purifies air supplied to the carburetor 50. The air taken in from the air cleaner 46 is mixed with the fuel by the carburetor 50, and is thereafter inhaled to the cylinder 41.

The fuel tank 100 includes a tank bracket 120. The fuel tank 100 is attached to the seat frame 34 by the tank bracket 120.

The fuel tank 100 is preferably formed by performing a bending process for a plurality of metal plates, for example. The fuel tank 100 includes the left side portion 100La (refer to FIG. 1) and the right side portion 100Ra. A fuel filler (not shown) is provided in an upper surface of the fuel tank 100. A fuel cap 110 is attached to the fuel filler. Note that details of the fuel tank 100 are described later.

As illustrated in FIG. 4, on the right side portion 100Ra, the fuel tank 100 includes engagement portions 131 and 132 and an attachment portion 133. The shroud 200R illustrated in FIG. 3 is attached to the engagement portions 131 and 132 and attachment portion 133.

The shroud 200R includes a lower edge portion 200Ra. The lower edge portion 200Ra is substantially parallel to an upper surface of the cylinder head 42 when viewed from one side. Specifically, the lower edge portion 200Ra extends in a direction substantially perpendicular to a direction where the down tube 33 extends.

(3) Attachment Position of Canister 300

The motorcycle 10 includes a canister 300 that suppresses gas generated by evaporation of the fuel from being emitted to the air. In this preferred embodiment, the canister 300 preferably is constituted as a fuel evaporation gas emission suppressing device, for example.

Figure 9:
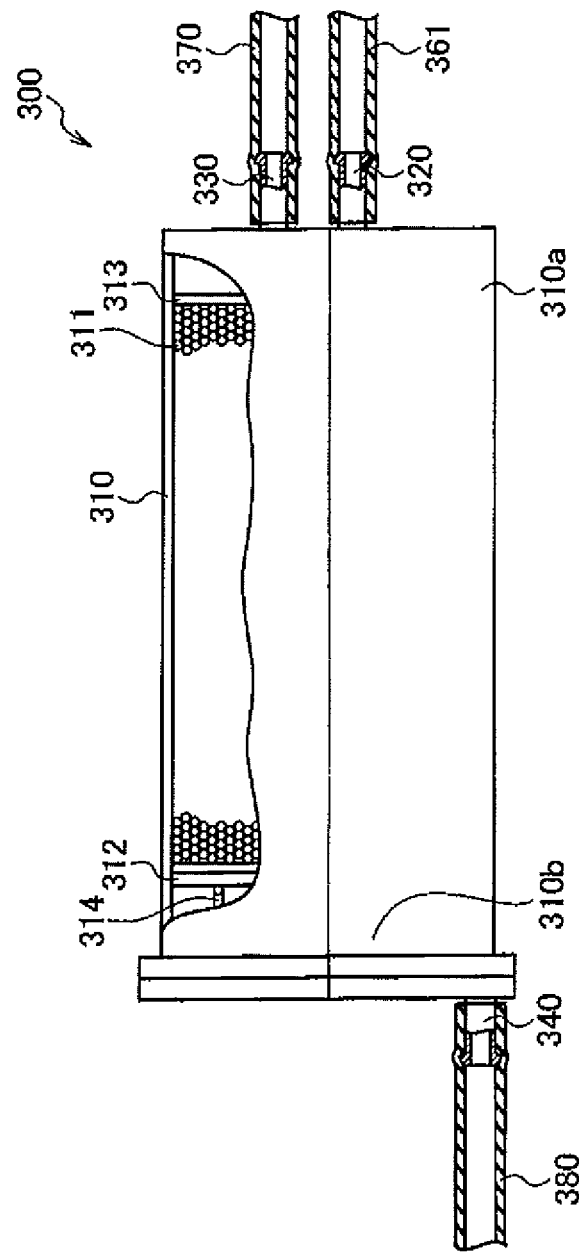
FIG. 9 is a partially cutaway right side view of the canister attached to the motorcycle as the straddle-type vehicle according to a preferred embodiment of the present invention.

The canister 300 includes a cylindrical portion 310 provided with a function of purifying the gas (refer to FIG. 9). As illustrated in FIG. 4, the canister 300 is arranged on the right side portion of the motorcycle 10. Specifically, the canister 300 is arranged on the side portion opposite to the side portion on which the side stand 80 is arranged. Further, the canister 300 is arranged on a right side portion in a gap formed in front of the carburetor 50, below the fuel tank 100, and above the cylinder head 42. Further, on a left side portion in this gap, the fuel hose 170 is arranged (refer to FIG. 5). A longitudinal direction of the cylindrical portion 310 extends along the longitudinal direction of the motorcycle 10.

The canister 300 is attached to an attachment portion 39 provided on a coupling portion 35 (not shown in FIG. 4, refer to FIG. 8) of the body frame 30 through a bracket 38.

The lower edge portion 200Ra of the shroud 200R illustrated in FIG. 3 is located below a lower end portion 300a (refer to FIG. 4) of the canister 300 in a state in which the shroud 200R is mounted on the fuel tank 100. Specifically, the canister 300 is hidden by the shroud 200R in the state in which the shroud 200R is mounted on the fuel tank 100 when viewed from one side (refer to FIG. 3).

A roll over valve 360, a hose 361, a purge hose 370, and an emission hose 380 are all connected to the canister 300.

The roll over valve 360 prevents the fuel from flowing from the fuel tank 100 into the canister 300 when the motorcycle 10 rolls at a predetermined angle or more. The rollover valve 360 is arranged below the fuel tank 100 and in front of the canister 300, that is, below a front end portion 100c of the fuel tank 100. The roll over valve 360 is attached to the down tube 33 by a valve support portion 38a.

The emission hose 380 extends downward of the vehicle along the down tube 33. The hose 361 is coupled to the roll over valve 360. A hose 143 couples the roll over valve 360 and the fuel tank 100 to each other. Further, the purge hose 370 passes through a center portion of the vehicle and is coupled to the carburetor 50. As illustrated in FIG. 5, this purge hose 370 is arranged on the right side portion of the motorcycle 10. Specifically, the purge hose 370 is arranged on the side portion opposite to the side portion on which the fuel hose 170 is arranged. Further, as illustrated in FIG. 4, the purge hose 370 is arranged between a lower end portion 100a of the fuel tank 100 and the cylindrical portion 310 when the motorcycle 10 is viewed from one side.

As described above, the canister 300 is connected to the fuel tank 100 by the roll over valve 360 and the hose 143. Further, the canister 300 is connected to the carburetor 50 by the purge hose 370. Details of the structure of the canister 300 are described later.

(4) Structure of Fuel Tank 100

Figure 6:
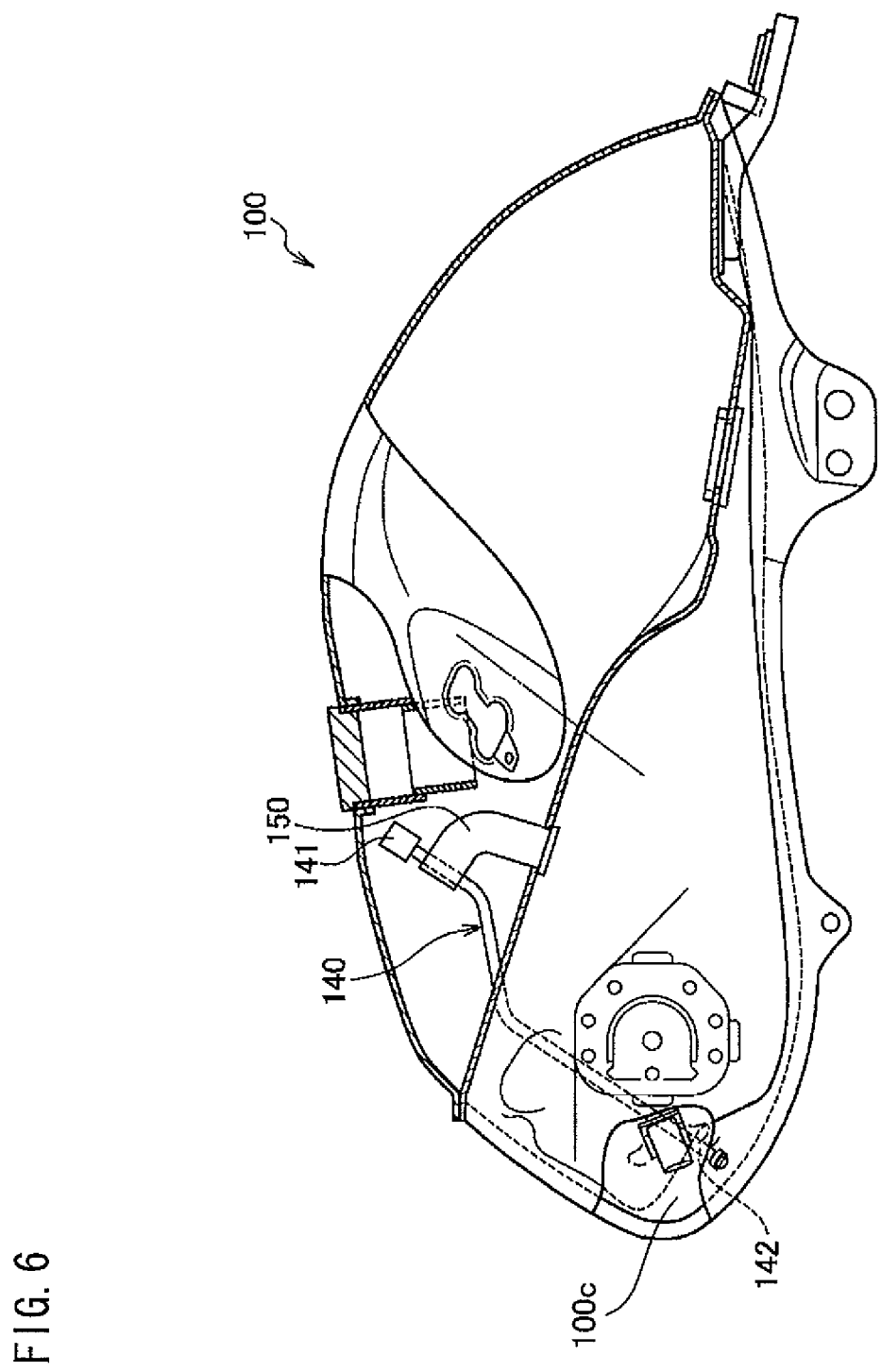
FIG. 6 is a partially cutaway left side view of a fuel tank of the motorcycle as the straddle-type vehicle according to a preferred embodiment of the present invention.
Figure 7:
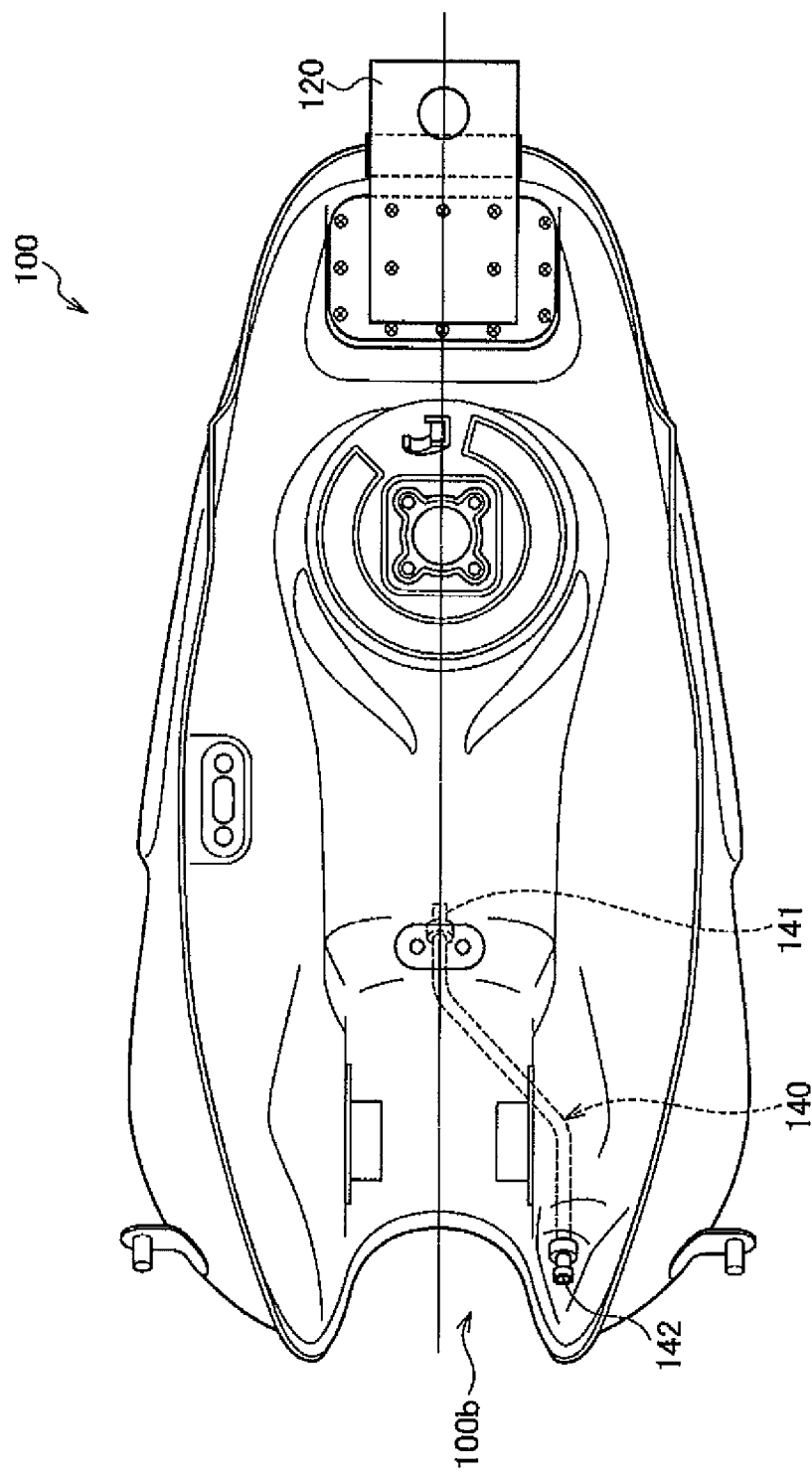
FIG. 7 is a bottom view of the fuel tank of the motorcycle as the straddle-type vehicle according to a preferred embodiment of the present invention.

Next, a description is made of the structure of the fuel tank 100 with reference to FIG. 6 and FIG. 7. FIG. 6 is a partially cutaway left side view of the fuel tank 100. FIG. 7 is a bottom view of the fuel tank 100.

On a bottom surface of the fuel tank 100, a recessed portion 100b inside which the main frame 32 (refer to FIG. 4) is located is provided. The fuel tank 100 is attached to the main frame 32 through the tank bracket 120 in a state in which the main frame 32 is located in the recessed portion 100b.

The fuel tank 100 includes a pipe 140. On an upper end portion of the pipe 140, a suction port 141 is arranged.

On a bottom surface of the front end portion 100c of the fuel tank 100, a connecting portion 142 open to the outside of the fuel tank 100 is arranged. The hose 143 coupled to the above-described roll over valve 360 is coupled to the connecting portion.

The pipe 140 is supported in an inside of the fuel tank 100 by a stay 150, and is coupled to the connecting portion 142.

The suction port 141 is arranged so as to be located above a liquid level of the fuel in a state in which the inside of the fuel tank 100 is filled with the fuel and the motorcycle 10 is not leaned.

The gas as a result of the evaporation of the fuel in the fuel tank 100 is sucked from the suction port 141, and is introduced into the canister 300 via the pipe 140, the connecting portion 142, the hose 143, the roll over valve 360, and the hose 361.

(5) Structure of Body Frame 30

Figure 8:
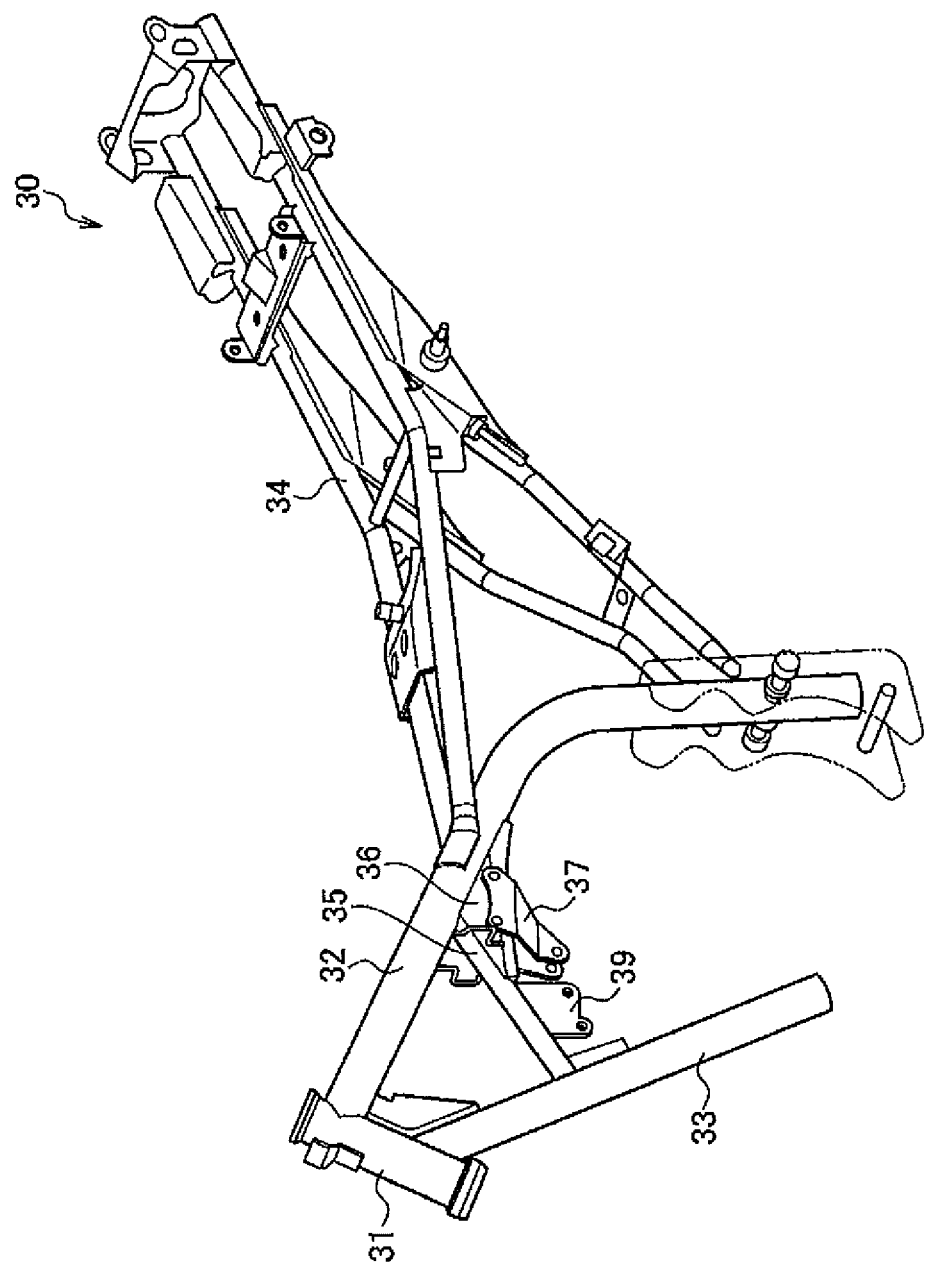
FIG. 8 is a perspective view describing a structure for attaching a canister to a body frame in the motorcycle as the straddle-type vehicle according to a preferred embodiment of the present invention.

FIG. 8 is a perspective view describing a structure for attaching the canister 300 to the body frame 30. As illustrated in FIG. 8, the body frame 30 includes the coupling portion 35 that couples the main frame 32 and the down tube 33 to each other. The coupling portion 35 includes the attachment portion 39 to which the bracket 38 (refer to FIG. 4) is attached.

Gussets 36 are arranged between the main frame 32 and the coupling portion 35. The gussets 36 are arranged in order to enhance rigidity of the body frame 30. Brackets 37 are arranged on the gussets 36. The canister 300 is attached to the brackets 37.

(6) Structure of Canister 300

Next, a description is made of the structure of the canister 300 with reference to FIG. 9. FIG. 9 is a partially cutaway right side view of the canister 300.

As illustrated in FIG. 9, the cylindrical portion 310 includes a connecting portion 320, a connecting portion 330, and a connecting portion 340. The connecting portion 320 and the connecting portion 330 are located on a front end portion 310a of the cylindrical portion 310. Further, the connecting portion 340 is located on a rear end portion 310b of the cylindrical portion 310.

The hose 361 is coupled to the connecting portion 320. Specifically, the connecting portion 320 is coupled to the fuel tank 100 through an intermediation of the roll over valve 360.

The purge hose 370 is coupled to the connecting portion 330. Specifically, the connecting portion 330 is coupled to the carburetor 50 through an intermediation of the purge hose 370.

The emission hose 380 is coupled to the connecting portion 340. Specifically, the gas purified in an inside of the cylindrical portion 310 is emitted from the connecting portion 340.

In the present preferred embodiment, the connecting portion 320 is constituted as a tank connection portion. The connecting portion 330 is constituted as a throttle body connecting portion. Further, the connecting portion 340 and the emission hose 380 are constituted as an emission portion.

The cylindrical portion 310 includes a wall portion 312 and a wall portion 313 in the inside thereof. The wall portion 312 and the wall portion 313 are permeable to the gas.

The cylindrical portion 310 includes activated carbon 311 in the inside thereof. The activated carbon 311 is filled between the wall portion 312 and the wall portion 313.

Further, the cylindrical portion 310 includes a spring 314. The spring 314 urges the wall portion 312 as at least one of the wall portions in a direction toward the other wall portion 313. In such a way, the activated carbon is prevented from moving in the inside of the cylindrical portion 310 despite leaning, vibrations and the like of the motorcycle 10.

(7) Structure of Carburetor 50

Figure 10:
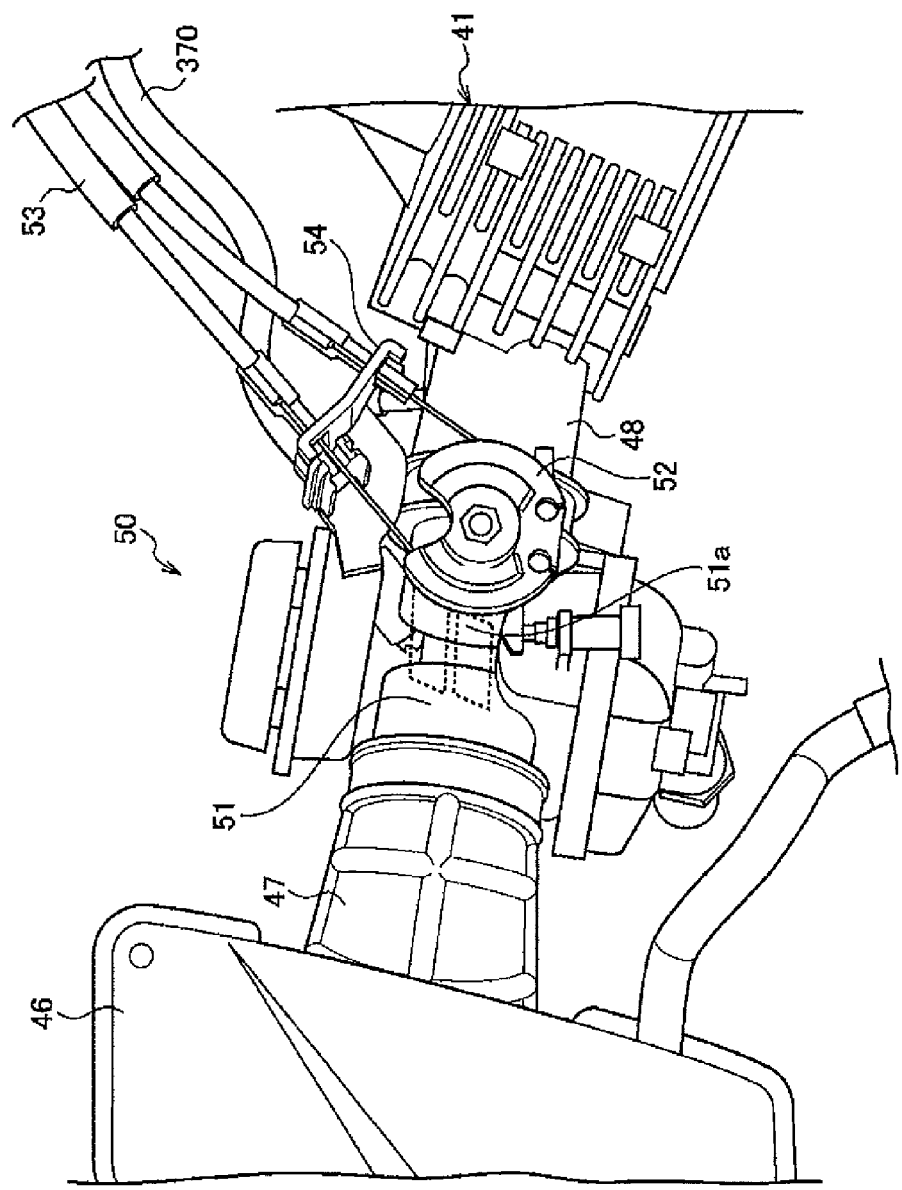
FIG. 10 is a right side view of a carburetor attached to the motorcycle as the straddle-type vehicle according to a preferred embodiment of the present invention.
Figure 11:
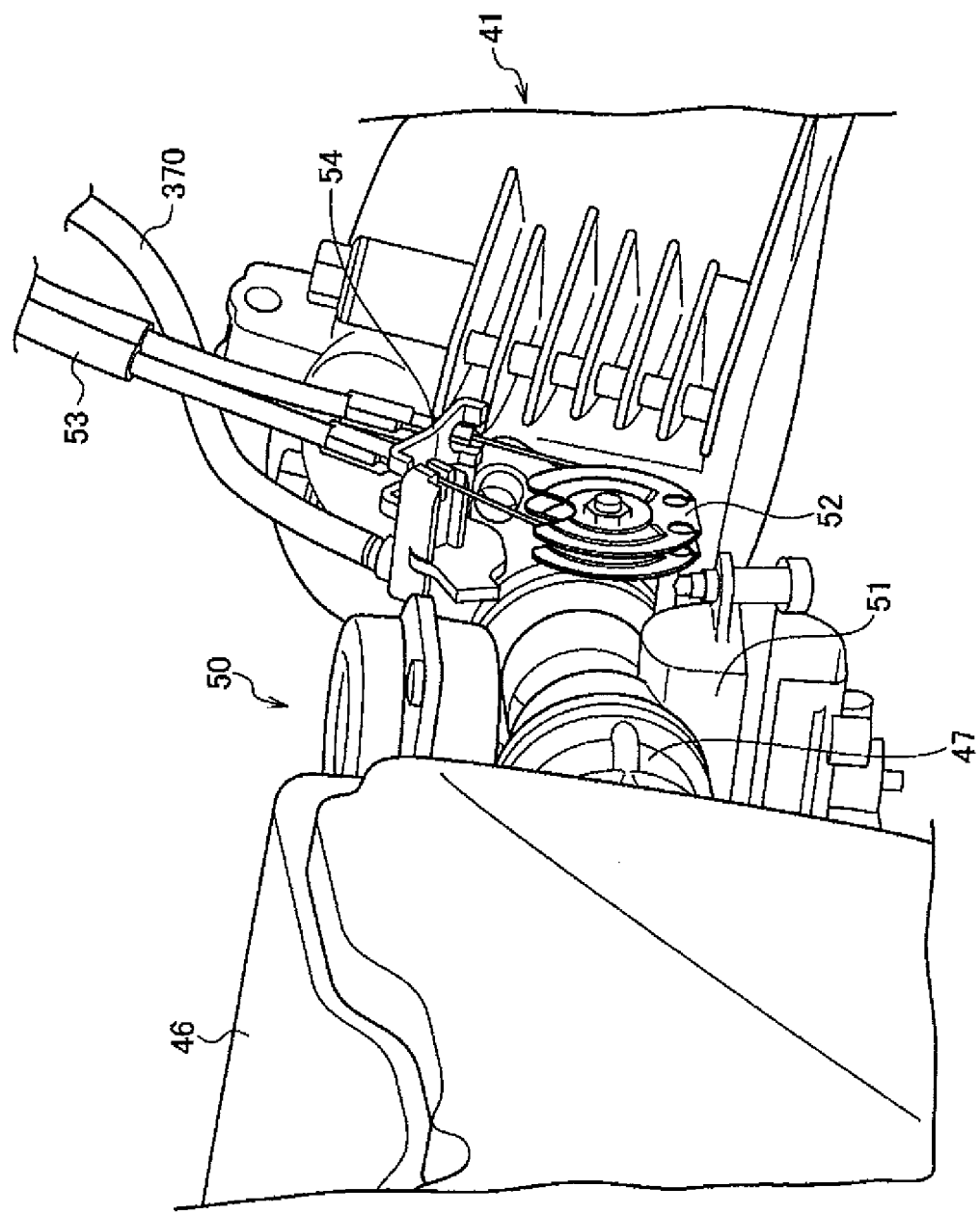
FIG. 11 is a perspective view of the carburetor attached to the motorcycle as the straddle-type vehicle according to a preferred embodiment of the present invention when viewed from a right rear of the vehicle.
Figure 12:
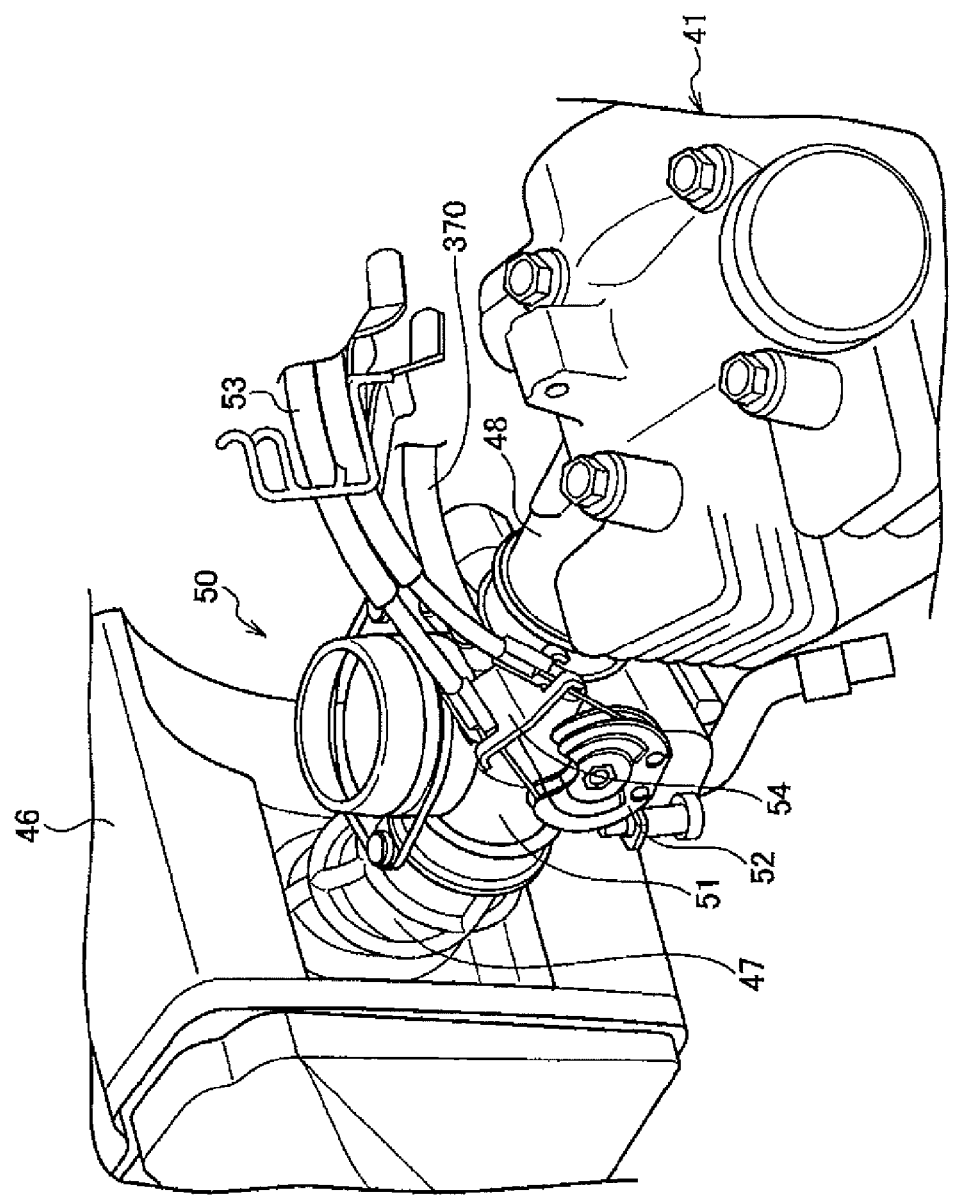
FIG. 12 is a perspective view of the carburetor attached to the motorcycle as the straddle-type vehicle according to a preferred embodiment of the present invention when viewed from a right front of the vehicle.

Next, a description is made of the structure of the carburetor 50 with reference to FIG. 10, FIG. 11 and FIG. 12. FIG. 10 is a right side view of the carburetor 50 attached to the motorcycle 10. FIG. 11 is a perspective view of the carburetor 50 attached to the motorcycle 10 when viewed from a right rear of the vehicle. FIG. 12 is a perspective view of the carburetor 50 attached to the motorcycle 10 when viewed from a right front of the vehicle.

The carburetor 50 includes a throttle valve 51a, a body portion 51, a throttle pulley 52, a throttle wire 53, and a bracket 54. In the present preferred embodiment, the throttle pulley 52 and the bracket 54 are constituted as a wire connecting portion to which the throttle wire 53 is connected.

An intake duct 47 that takes the air purified in the air cleaner 46 into the body portion 51 and an intake duct 48 that sends out the air-fuel mixture to the cylinder 41 are coupled to the carburetor 50.

The throttle valve 51a adjusts an inflow amount of the air taken into the body portion 51 through the intake duct 47, and an inflow amount of the air-fuel mixture to the cylinder 41. The throttle valve 51a is built in the body portion 51.

The throttle pulley 52 is coupled to the throttle valve 51a. The throttle pulley 52 rotates the throttle valve 51a.

The throttle wire 53 is connected to the throttle pulley 52. The throttle wire 53 is supported on the bracket 54. The throttle wire 53 is coupled to a throttle grip (not shown) provided on a handle grip portion of the motorcycle 10.

A rotational operation of the throttle grip (not shown) is transmitted to the throttle pulley 52 through the throttle wire 53. The throttle valve 51a is adjusted in response to the rotational operation of the throttle pulley 52.

The throttle pulley 52 and the bracket 54 are arranged on an outer side in the vehicle width direction than the body portion 51.

The purge hose 370 is arranged between the body portion 51, and the throttle pulley 52 and the bracket 54. The purge hose 370 is arranged in an inner side in the vehicle width direction than the throttle pulley 52 and the bracket 54. The purge hose 370 is arranged along the throttle wire 53.

In a section 370a (refer to FIG. 4), the purge hose 370 is located on the outer side in the vehicle width direction than the throttle wire 53. On the carburetor 50 side with respect to the section 370a, the purge hose 370 intersects the throttle wire 53.

(8) Functions/Effects

In the above-described motorcycle 10, as illustrated in FIG. 4, the fuel tank 100 is arranged over the engine 40, the carburetor 50 that constitutes the throttle body is arranged below the fuel tank 100 and behind of the cylinder 41 and the cylinder head 42, and the canister 300 is arranged between the fuel tank 100 and the cylinder head 42.

In accordance with this configuration, the canister 300 is arranged between the fuel tank 100 and the cylinder head 42, and accordingly, the canister 300 is arranged to be warmed up by receiving heat from the cylinder head 42 during an operation of the engine 40. Meanwhile, the canister 300 is rarely exposed to direct sunlight because the fuel tank 100 covers an upper portion of the canister 300, and accordingly, the canister 300 is cooled down during a stop of the engine 40.

In particular, the cylinder head 42 includes a combustion chamber, and is a portion in which temperature is relatively high in the engine 40. Accordingly, the canister 300 is arranged between the fuel tank 100 and the cylinder head 42, whereby it is easy to ensure that the heat needed to warm up the canister 300 is reliably provided. Further, a foreign object such as a stone, which comes flying from the outside, is also prevented from colliding with the canister 300. Note that the canister 300 receives a running wind while the vehicle is running, and accordingly, is prevented from being excessively heated. Further, the heat that travels from the engine 40 toward the fuel tank 100 is absorbed by the canister 300 interposed therebetween, and accordingly, the evaporation of the fuel in the fuel tank 100 is prevented.

Further, the canister 300 is provided at height below the fuel tank 100 and above the carburetor 50, and is provided at the position between the connecting portion 142 of the fuel tank 100 and the carburetor 50. Therefore, it is possible to shorten the hose 143 that reaches the canister 300 from the connecting portion 142 of the fuel tank 100, and the purge hose 370 that reaches the carburetor 50 from the canister 300, and it is easy to install both of the hoses. Further, these hose 143 and purge hose 370 can be collected to the front end portion 310a of the cylindrical portion 310, whereby maintenance work therefore becomes easy.

Further, in the above-described motorcycle 10, as illustrated in FIG. 3, the shroud 200R is attached to the right side portion 100Ra of the fuel tank 100, and the lower edge portion 200Ra of this shroud 200R is located below the lower end portion 300a (refer to FIG. 4) of the canister 300. As described above, the shroud 200R is provided on the side of the canister 300, whereby the canister 300 is hidden by the shroud 200R in terms of exterior appearance. In addition, the above-described effects can be further enhanced, that is, the effect that the canister 300 is warmed up by receiving the heat from the cylinder head 42, the effect that a collision with a foreign object is prevented, and the effect that the direct sunlight is cut off.

Further, in the above-described motorcycle 10, as illustrated in FIG. 4, a length from the front end of the cylindrical portion 310 to the rear end thereof in the longitudinal direction of the vehicle is preferably set to be larger than a length from an upper end thereof to the lower end thereof in a vertical direction of the vehicle. Therefore, the fuel tank 100 and the engine 40 can be brought close to each other, and vehicle height of the motorcycle 10 can be minimized. Further, as illustrated in FIG. 4 and FIG. 5, the length from the front end of the cylindrical portion 310 to the rear end thereof in the longitudinal direction of the vehicle is preferably set to be larger than a length from a left end thereof to a right end thereof in the vehicle width direction. As described above, the longitudinal direction of the cylindrical portion 310 is arranged to extend along the longitudinal direction of the vehicle, whereby the cylindrical portion 310 can be made to approach the center in the vehicle width direction, and as a result, a vehicle width of the motorcycle 10 can be minimized.

Further, in the above-described motorcycle 10, as illustrated in FIG. 4, the cylindrical portion 310 of the canister 300 is arranged in a posture in which a lower end of a front portion in the longitudinal direction of the vehicle is located slightly above a lower end of a rear portion therein. Therefore, while the vehicle is running, the running wind blows a lower surface of the cylindrical portion 310, and this running wind that has blown the lower surface is introduced to the cylinder head 42 side. Specifically, due to the fact that the running wind blows the lower surface of the cylindrical portion 310, the canister 300 is prevented from being excessively heated, and by the fact that the running wind is introduced to the cylinder head 42 side, cooling of the cylinder head 42 is also promoted.

Further, in accordance with the motorcycle 10, the canister 300 is arranged in the gap located in front of the carburetor 50, below the fuel tank 100, and above the cylinder head 42. Further, the carburetor 50 is also arranged below the fuel tank 100. Therefore, the canister 300 is arranged in the vicinities of the fuel tank 100 and the carburetor 50.

Hence, in the case where a vehicle dimension is small, the motorcycle 10 in which the canister 300 is arranged in the vicinities of the fuel tank 100 and the carburetor 50 can be provided.

Further, the canister 300 is arranged in front of the carburetor 50. Accordingly, in comparison with the case where the fuel tank, the canister, the throttle body and the engine are arranged in the vertical direction of the motorcycle, overall height (seat height) of the motorcycle can be minimized.

Specifically, even in the case of the motorcycle 10 in which the vehicle dimension is relatively small, the canister 300 can be arranged in the vicinities of the fuel tank 100 and the carburetor 50.

The motorcycle 10 includes the shroud 200R that extends downward from the right side portion 100Ra of the fuel tank 100, and the lower edge portion 200Ra of the shroud 200R is located below the lower end portion 300a of the canister 300. Further, the canister 300 includes the cylindrical portion 310, and the longitudinal direction of the cylindrical portion 310 extends along the longitudinal direction of the motorcycle 10.

In such a way as described above, in accordance with the motorcycle 10, the canister 300 is hidden by the shroud 200R. Hence, in accordance with the motorcycle 10, exterior appearance quality of the motorcycle can be enhanced.

In accordance with the motorcycle 10, the connecting portion 320 that communicates with the fuel tank 100 and the connecting portion 330 that communicates with the carburetor 50 are located at the front end portion 310a of the cylindrical portion 310. Further, the connecting portion 142 is arranged on the bottom surface of the front end portion 100c of the fuel tank 100.

Hence, a piping length from the fuel tank 100 to the canister 300 can be shortened. Further, pipe installation can be performed easily.

Further, in accordance with the motorcycle 10, the roll over valve 360 is arranged below the front end portion 100c of the fuel tank 100. Hence, the piping length from the fuel tank 100 to the canister 300 can be shortened. Further, the pipe installation can be performed easily.

Further, in accordance with the motorcycle 10, the canister 300 is attached to the body frame 30 by the brackets 37 and the bracket 38. Further, the roll over valve 360 that prevents the fuel from flowing into the canister 300 while the fuel is still in a liquid state is fixed to the down tube 33 by the valve support portion 38a. Further, in accordance with the motorcycle 10, the brackets 37 and the bracket 38 are attached to the coupling portion 35 that couples the main frame 32 and the down tube 33 to each other.

Further, to the left side portion 100La of the fuel tank 100, the shroud 200L that extends downward from this left side portion 100La is attached. Further, to the right side portion 100Ra of the fuel tank 100, the shroud 200R that extends downward from this right side portion 100Ra is attached.

Hence, the canister 300 can be securely and reliably fixed by the brackets 37 and the bracket 38, which are for supporting the canister 300 while avoiding visual recognition of the canister.

In accordance with the motorcycle 10, the fuel hose 170 is arranged on the left side portion of the motorcycle 10, and the canister 300 is arranged on the right side portion of the motorcycle 10. Hence, a space located below the fuel tank 100 can be utilized efficiently.

In accordance with the motorcycle 10, the canister 300 is arranged in the gap located in front of the carburetor 50, below the fuel tank 100, and above the cylinder head 42. Further, the carburetor 50 is arranged below the fuel tank 100. Specifically, the canister 300 is arranged in the vicinities of the fuel tank 100 and the carburetor 50. The purge hose 370 is arranged between the body portion 51 of the carburetor 50, and the throttle pulley 52 and bracket 54 thereof.

Therefore, for example, in comparison with the case where the purge hose 370 is arranged toward the body portion 51 from the outside of the throttle pulley 52 and the bracket 54, the throttle wire 53 connected to the throttle pulley 52 and the bracket 54 can be prevented from interfering with the purge hose 370.

Specifically, in accordance with the motorcycle 10, even in the case where the vehicle dimension is made small, and the canister 300 is arranged in the vicinity of the carburetor 50, the throttle wire 53 and the purge hose 370 can be prevented from interfering with each other.

In accordance with the motorcycle 10, the throttle pulley 52 and the bracket 54 are arranged on the outer side in the vehicle width direction than the body portion 51, and the purge hose 370 is arranged in the inner side in the vehicle width direction than the throttle pulley 52 and the bracket 54. Further, the purge hose 370 is arranged along the throttle wire 53.

In accordance with the motorcycle 10, even in the case where the canister 300 and the carburetor 50 are housed in a space narrow in the vertical direction, the interference between the throttle wire 53 and the purge hose 370 can therefore be prevented more surely.

The purge hose 370 intersects the throttle wire 53, and in the section 370a, the purge hose 370 is located on the outer side in the vehicle width direction than the throttle wire 53.

Hence, in accordance with the motorcycle 10, even in the case where the canister 300 is arranged on one of the side portions of the motorcycle 10, and the canister 300 and the carburetor 50 are housed in the space narrow in the vertical direction, the interference between the throttle wire 53 and the purge hose 370 can be surely prevented.

In accordance with the motorcycle 10, the fuel hose 170 that supplies the fuel to the carburetor 50 is located between the fuel tank 100 and the carburetor 50. This fuel hose 170 is preferably arranged on the left side portion of the motorcycle 10, for example. The purge hose 370 is preferably arranged on the right side portion of the motorcycle 10, for example.

Hence, the fuel hose 170 can be prevented from interfering with the purge hose 370 or the throttle wire 53.

In accordance with the motorcycle 10, the canister 300 includes the cylindrical portion 310, and the longitudinal direction of the cylindrical portion 310 extends along the longitudinal direction of the motorcycle 10.

The connecting portion 320 that communicates with the fuel tank 100 is located at the front end portion 310a of the cylindrical portion 310. Further, the connecting portion 142 is arranged on the bottom surface of the front end portion 100c of the fuel tank 100. The roll over valve 360 is arranged below the front end portion 100c of the fuel tank 100.

Hence, the connecting portion 320 and the connecting portion 142 are coupled to each other through the roll over valve 360, whereby the piping length from the fuel tank 100 to the canister 300 can be shortened. Further, the pipe installation can be performed easily.

The canister 300 includes the emission hose 380 that emits, from the cylindrical portion 310, the gas purified in the inside of the cylindrical portion 310, and the emission hose 380 is connected to the rear end portion 310b of the cylindrical portion 310. Further, the connecting portion 330 that communicates with the carburetor 50 is formed on the front end portion 310a of the cylindrical portion 310, and the purge hose 370 coupled to the connecting portion 330 is arranged between the lower end portion 100a of the fuel tank 100 and the cylindrical portion 310 when the motorcycle 10 is viewed from one side.

Hence, in accordance with the motorcycle 10, in the case where the canister 300 and the carburetor 50 are housed in the space narrow in the vertical direction, the pipe installation can be improved.

(9) Other Preferred Embodiments

As described above, the contents of the present invention have been disclosed through the above-described preferred embodiments of the present invention. However, it should be understood that the description and the drawings, which form a part of this disclosure, do not limit the present invention. From this disclosure, a variety of alternative preferred embodiments are apparent and clear to those skilled in the art.

In the above-described preferred embodiments, the motorcycle 10 is described as an example of the straddle-type vehicle. However, the vehicle of the present invention just needs to be the straddle-type vehicle, and the number of wheels is not limited to two. For example, the number of wheels may be three. Alternatively, the number of wheels may be four.

In the above-described preferred embodiments, the fuel hose 170 is preferably arranged on the left side portion of the motorcycle 10, and the canister 300 is preferably arranged on the right side portion of the motorcycle 10, for example. However, the canister 300 may be arranged on the left side portion of the motorcycle 10, and the fuel hose 170 may be arranged on the right side portion thereof.

In the above-described preferred embodiments, the brackets 37 and the bracket 38, which support the canister 300, do not have to be attached to the body frame 30, and in particular, to the main frame 32.

In the above-described preferred embodiments, in the canister 300, the connecting portion 320 that communicates with the fuel tank and the connecting portion 340 from which the gas purified in the inside of the cylindrical portion is emitted do not necessarily have to be located at the front end portion 310a of the cylindrical portion 310.

In the above-described preferred embodiments, the canister 300 preferably includes the roll over valve 360. The roll over valve 360 does not have to be fixed to the bracket 38. Further, the canister 300 does not necessarily have to include the roll over valve 360.

In the above-described preferred embodiments, the specific structure of the canister 300 has been described with reference to FIG. 9. However, the canister 300 just needs to be provided with such a function of suppressing the gas as the resultant of the evaporation of the fuel from being emitted to the air, and is not limited to the structure illustrated in FIG. 9. For example, a material that has such a gas adsorption capacity can be used in place of the activated carbon 311.

In the motorcycle 10 according to various preferred embodiments of the present invention, the purge hose 370 just needs to be arranged between the body portion 51, and the throttle pulley 52 and the bracket 54, and the throttle pulley 52 and the bracket 54 do not have to be arranged on the outer side in the vehicle width direction than the body portion 51. Further, the purge hose 370 does not have to be arranged along the throttle wire 53.

Further, the section 370a in which the purge hose 370 is located on the outer side in the vehicle width direction than the throttle wire 53 is not limited to the section illustrated in FIG. 4.

For example, between the lower end portion 100a of the fuel tank 100 and the cylindrical portion 310, the purge hose 370 may intersect the throttle wire 53, and may be located in the inside in the vehicle width direction.

In the above-described preferred embodiments, the side stand 80 is arranged on the left side portion of the motorcycle 10, and the canister 300 is arranged on the right side portion of the motorcycle 10. However, the canister 300 may be arranged on the left side portion of the motorcycle 10, and the side stand 80 may be arranged on the right side portion thereof.

In the above-described preferred embodiments, the longitudinal direction of the cylindrical portion 310 preferably extends along the longitudinal direction of the motorcycle 10. Further, in the canister 300, the connecting portion 320 that communicates with the fuel tank and the connecting portion 340 from which the gas purified in the inside of the cylindrical portion is emitted do not necessarily have to be located at the front end portion 310a of the cylindrical portion 310. The connecting portion 320 and the connecting portion 340 just need to avoid adopting a structure that unnecessarily lengthens the pipes, and are appropriately changeable in response to the structure of the canister 300.

As described above, it is a matter of course that the present invention incorporates a variety of preferred embodiments which are not described herein. Hence, the technical scope of the present invention is defined only by matters to define the invention, which are according to the scope of claims reasonable from the above description.

The invention claimed is:

1. A straddle-type vehicle comprising:
    an engine including a crankcase, a cylinder arranged on the crankcase, and a cylinder head arranged on the cylinder, to generate power to drive a wheel;
    a fuel tank arranged over the engine and to store fuel consumed by the engine;
    a throttle body at least partially arranged below the fuel tank and behind the cylinder and the cylinder head, and to adjust an amount of an air-fuel mixture supplied to the engine; and
    a canister connected to the fuel tank and the throttle body, and arranged to suppress gas generated by evaporation of the fuel in the fuel tank from being emitted to ambient air; wherein
    the canister is arranged entirely below a lowermost end portion of the fuel tank and at least partially above the cylinder head in a side view of the vehicle.

2. The straddle-type vehicle according to claim 1, further comprising a cover member attached to a side portion of the fuel tank, wherein a lower end portion of the cover member is located below the canister.

3. The straddle-type vehicle according to claim 1, wherein the canister includes a cylindrical portion; and
a length of the cylindrical portion in a vehicle longitudinal direction is larger than a length thereof in a vehicle vertical direction.

4. The straddle-type vehicle according to claim 3, wherein the length of the cylindrical portion in the vehicle longitudinal direction is larger than a length thereof in a vehicle width direction.

5. The straddle-type vehicle according to claim 3, wherein the cylindrical portion is arranged in a posture in which a lower end of a front portion thereof is located above a lower end of a rear portion thereof.

6. The straddle-type vehicle according to claim 3, wherein a front end portion of the cylindrical portion includes a tank connecting portion arranged to communicate with the fuel tank.

7. The straddle-type vehicle according to claim 6, wherein the front end portion of the cylindrical portion includes a throttle body connecting portion arranged to communicate with the throttle body.

8. The straddle-type vehicle according to claim 1, further comprising a roll over valve arranged to suppress the fuel from flowing from the fuel tank into the canister when the straddle-type vehicle rolls at a predetermined angle or more, wherein the roll over valve is arranged below the fuel tank and in front of the canister.

9. The straddle-type vehicle according to claim 1, wherein the canister is supported on a bracket attached to a body frame.

10. The straddle-type vehicle according to claim 9, further comprising a roll over valve arranged to suppress the fuel from flowing from the fuel tank into the canister when the straddle-type vehicle rolls at a predetermined angle or more, wherein the roll over valve is supported on the bracket.

11. The straddle-type vehicle according to claim 9, wherein
the body frame includes a center frame portion arranged to extend rearward in a vehicle longitudinal direction from a steering head pipe arranged to support a steering shaft;
the fuel tank includes a recessed portion formed thereon, inside which the center frame portion is located; and
the bracket is attached to the center frame portion.

12. The straddle-type vehicle according to claim 1, further comprising a fuel passage arranged to supply the fuel from the fuel tank to the throttle body, wherein the canister and the fuel passage are arranged across a center in a vehicle width direction from each other.

13. The straddle-type vehicle according to claim 3, wherein a rear end portion of the cylindrical portion is connected to an emission hose arranged to emit gas purified in an inside of the cylindrical portion.

* * * * *